(12) United States Patent
Prasad et al.

(10) Patent No.: US 10,848,377 B2
(45) Date of Patent: Nov. 24, 2020

(54) ACCESS POINT INSTANTIATION OF A MESH NETWORK

(71) Applicant: HEWLETT PACKARD ENTERPRISE DEVELOPMENT LP, Houston, TX (US)

(72) Inventors: Ananth Narayanan Easwar Prasad, Karnataka (IN); Subbulakshmi Viswesvaran, Karnataka (IN); Vivek Chenthamarakshan, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 10 days.

(21) Appl. No.: 16/258,750

(22) Filed: Jan. 28, 2019

(65) Prior Publication Data
US 2020/0244517 A1 Jul. 30, 2020

(51) Int. Cl.
*H04L 12/24* (2006.01)
*H04W 76/10* (2018.01)
*H04W 84/22* (2009.01)

(52) U.S. Cl.
CPC ........ *H04L 41/0668* (2013.01); *H04W 76/10* (2018.02); *H04W 84/22* (2013.01)

(58) Field of Classification Search
CPC .................................................. H04L 41/0668
See application file for complete search history.

(56) References Cited

U.S. PATENT DOCUMENTS

| | | | |
|---|---|---|---|
| 7,496,078 B2 | 2/2009 | Rahman | |
| 7,839,771 B2 | 11/2010 | Zeng et al. | |
| 8,248,949 B2 | 8/2012 | Ozer et al. | |
| 9,306,839 B2 | 4/2016 | Shanmugav | |
| 2007/0019598 A1* | 1/2007 | Prehofer | H04W 36/0055 370/338 |
| 2008/0298249 A1 | 12/2008 | Baker et al. | |
| 2009/0245163 A1* | 10/2009 | Inoue | H04W 24/04 370/315 |
| 2009/0323555 A1* | 12/2009 | Lancaster | H04L 41/0253 370/254 |

(Continued)

OTHER PUBLICATIONS

Portolés, M. et al., Link Recovery in IEEE 802.11 WLAN Using WDS, (Research Paper). Retrieved Nov. 29, 2018, 4 Pgs.

*Primary Examiner* — Kevin M Cunningham
(74) *Attorney, Agent, or Firm* — Nolte Intellectual Property Law Group (57) ABSTRACT

Systems and methods address automatic reconfiguration of one or more access points (APs) within a wireless local area network (WLAN). The disclosed automatic reconfiguration may take place responsive to detection of a wired uplink failure of an AP. For example, the device experiencing failure may establish a wireless communication path to use as a mesh link with a remote wireless access point. Depending on network configuration type, a master in a master/slave configuration or a controller may direct the remote wireless access point to become a mesh portal to support the newly established mesh link. As a result, support of network communication for the plurality of wireless remote clients of the AP experiencing failure may be continued by the failed AP. Reconfiguration may take place without interruption of services for client devices or forcing client devices to form a new network association with a different AP.

20 Claims, 7 Drawing Sheets

(56) References Cited

U.S. PATENT DOCUMENTS

| | | | |
|---|---|---|---|
| 2014/0003286 A1* | 1/2014 | Estevez | H04W 48/02 370/254 |
| 2018/0102883 A1* | 4/2018 | Amini | G08B 13/2494 |
| 2019/0313265 A1* | 10/2019 | Yamamoto | H04W 88/08 |

* cited by examiner

ACCESS POINT INSTANTIATION OF A MESH NETWORK

BACKGROUND

Networks of computers that support business activities are often composed of a multitude of infrastructure devices (e.g., computational, storage, and network resources). These infrastructure devices may provide, for example, a cohesive system of coordinated computing devices that support many automated functions for a corporate enterprise. In some cases, these computing devices are connected to a network for communication with each other. Wireless and wired networks may be connected to each other, for example, using a device referred to as an Access Point (AP).

Wireless network connections between two devices may be used to connect those two network devices over a short distance (e.g., shorter distance than is possible using a wired connection). The use of wireless networking is common to connect smart-phones, laptops, tablets, and other computing devices to a local area network. Wireless networking may also be utilized to implement a point-to-point connection over short distances to allow the connection of two network sub-nets that may be composed of machines utilizing a wired network. Wireless networking utilizes radio waves to communicate, and radio waves are subject to interference which could cause communication disruption. At different points in a wireless network, some devices connect to a wired backbone using a wired uplink for that specific device (e.g., an AP may have a wired uplink). There are different types of APs available and different configurations in which they can operate. One type of wireless network is a mesh network that does not have every AP connect directly to a wired backbone. In, a mesh network, different wireless devices may be configured to act as peer-to-peer devices to establish a communication path from a wireless network to a wired network (or to simply support a totally wireless network). That is, some APs that do not have an uplink may piggy back off another AP's uplink seamlessly for the clients that are supported by those APs that do not have an uplink. In a non-mesh configuration, each AP connects, via a physical wired connection, to a network backbone. Hybrids of mesh and non-mesh wireless networks represent a network where only a portion of the APs connect via a physical wire.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not perform serial processing and therefore those functions may be performed in an order different than shown or possibly in parallel with each other. For a detailed description of various examples, reference will now be made to the accompanying drawings, in which.

DETAILED DESCRIPTION

Illustrative examples of the subject matter claimed below will now be disclosed. In the interest of clarity, not all features of an actual implementation are described for every example implementation in this disclosure. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Mesh APs learn about their environment when they boot up (or instantiate a mesh configuration). Mesh APs may be either configured as a mesh portal (MPP), an AP that uses its wired interface as an uplink to reach the controller, or a mesh point (MP), an AP that establishes an all-wireless path to the mesh portal. In some cases, mesh APs locate and associate with their nearest neighbor that provides the best path to the mesh portal. Mesh portals and mesh points are also known as mesh nodes. Mesh nodes is a generic term used to describe APs configured for a mesh (or hybrid) network (e.g., both mesh portals and mesh points are considered mesh nodes).

In some implementations, a mesh radio's bandwidth may be split logically between mesh-backhaul traffic and client traffic. Logical splitting may be accomplished, in part, by segregating communication traffic on a single local area network (LAN) into multiple virtual local area networks (VLANs). It is also possible to configure a radio within a networking device for mesh services only. In an implementation with a dual-radio AP, a mesh node may be configured to deliver client services on one radio and both mesh and wireless local area network (WLAN) services to clients on the other. Alternatively, it is possible to configure a single-radio AP to deliver mesh services only. When a single-radio AP is configured for mesh services only that mesh node (i.e., node provided by the AP) will not deliver WLAN services to its clients.

For mesh, as well as traditional thin AP deployments, a controller, sometimes referred to as a master controller, may be used to provide centralized provisioning, configuration, policy definition, ongoing network management, and wireless and security services. In some disclosed implementations (that differ from a traditional thin AP implementation), mesh nodes may also perform network traffic encryption/ decryption, and packet forwarding over wired and wireless links. Further, in some implementations the AP for mesh on the controller may be configured using multiple communication interfaces such as a WebUI (Web User Interface) or a CLI (Command Line Interface). In some example implementations, mesh related configuration parameters may be grouped into mesh profiles that may be utilized as needed for an AP group or individual APs. In some implementations, APs may default to operating as thin APs, which means their primary function is to receive and transmit electromagnetic signals. In this type of configuration, other WLAN processing may be provided by the controller.

Provisioning mesh APs is similar to provisioning thin APs; however, some differences will be noted here. For example, in some implementations, thin APs may establish a channel to the controller from which they receive the configuration for each radio interface. Mesh nodes, in contrast, may establish radio communications prior to interfacing with the controller. As a result, a minimum set of parameters may be made available for the mesh nodes (e.g., from the AP group and mesh cluster) to enable a mesh node to discover a neighbor for creating a mesh link. This mesh link created at startup, once established, may provide a communication path to interface with the controller.

Mesh clusters may be considered analogous to an Extended Service Set (ESS) in a WLAN infrastructure. For example, a mesh cluster may represent a logical set of mesh nodes that share a common connection and security parameters for creating mesh links. A BSSID (basic service set identifier) may be used to identify APs and clients associated with an AP broadcasting that BSSID, in a mesh network. Mesh clusters may be grouped and defined by a mesh cluster profile (e.g., one for each BSSID). Also, mesh clusters may enforce predictability in mesh networking by limiting the amount of concurrent mesh points, hop counts, and bandwidth used in the mesh network. A mesh cluster may also have multiple mesh portals and mesh points to be used to facilitate wireless communication between wired LANs. Mesh portals in a mesh cluster may or may not be on the same VLAN with each other.

In simple terms, a "mesh link" refers to the data link between a mesh point and its parent (the parent may be another mesh point that acts as a relay or a mesh portal that connects to the wired network). A mesh point may use parameters defined in the mesh cluster, in one example, a mesh cluster profile may be used to establish a mesh link with a neighboring mesh point. The mesh link may then use a series of metrics to establish the best path to the mesh portal. When creating the initial mesh link, mesh points may look for other mesh points advertising the same mesh service set identifier (MSSID) as the one contained in this mesh point's mesh cluster profile. The mesh point may then scan the channels in the appropriate provisioned band of operation to identify a list of neighbors that match the active mesh cluster profile. The mesh point may then select a path using highest priority neighbors based on the least expected path cost. However, if no provisioned mesh cluster profile is currently available, mesh points may use a recovery profile to establish an uplink. In a case where multiple cluster profiles are configured, mesh points may search in order of priority from a list of provisioned backup mesh cluster profiles (e.g., profiles available in memory) to establish an uplink. If the configured profiles are unavailable after searching for a configurable period of time, the recovery profile may be used to establish an uplink. Based on operating parameters (e.g., quality of signal) a mesh point may, over time, alter a path for an active mesh link. In some cases, changing a mesh link may invalidate all of the entries that have this mesh point as a next hop to the destination and trigger a new learning of network bridge tables.

In some example implementations, a new mesh link (or an initial mesh link) may be established based on a network configuration change. One example of a network configuration change may be failure of an uplink. Failure of the uplink may occur at an AP that has a wired uplink connection or may represent a failure of the uplink used as part of a mesh link path. According to disclosed implementations, failure of an uplink at an AP that has a wired uplink connection may initiate a process whereby that AP reconfigures itself (possibly with assistance of a controller) to become a mesh point (e.g., reconfigure itself from a) a mesh portal to a mesh point; or b) an AP that is not part of a mesh network to a mesh point). Upon reconfiguration to become a mesh point (e.g., based on failure of a direct connection to a wired network via a local uplink), the wireless network device that was acting as an AP may continue to support all wireless device connections already established with minimal disruption to associated wireless connections. That is, clients of this device undergoing automatic reconfiguration (e.g., responsive to local uplink failure) may not be aware of the failure of the uplink and may continue to operate without disruption (and without having to re-establish a network association to another AP for wireless communication).

In short, disclosed techniques involve automatically converting an access point to a mesh point as a failover mechanism for loss of wired connectivity by an AP in a WLAN deployment. In one implementation, mesh connections are respectively decided by the 'swarm master AP' and master controller. For example, a system as disclosed herein may convert a wireless access point from functioning in a traditional AP mode to functioning as a mesh point in a mesh network based on failure of that wireless AP's wired connection to a network. Thus, the clients of the wireless AP may be unaffected by a network failure occurring between a switch and the wireless AP. For example, the clients will not be forced to form a network association with a different wireless access point because of the failure.

Disclosed implementations address many different network availability levels. For example, in WLAN deployments, there are instances where high availability is important. High availability may be implemented, in part, by using extra APs for overlapping coverage so that the clients are not affected in the event of an AP going down. Based on techniques of this disclosure, an additional technique to maintain availability of an AP (e.g., in case of a wired uplink failure) is to alter communication to the wired network for that AP by using a nearby AP in a wireless fashion, as a mesh connection. It may therefore be desirable to provide redundancy of overlapping service areas such that, upon failure of a local uplink, an AP may choose an optimal mesh connection for continued operation without affecting client device connections.

As mentioned above, APs in WLAN deployments typically communicate with each other over the wired (Ethernet)

network in standard deployment scenarios. Using techniques of this disclosure APs may alter that communication path by using their wireless radios, like in a mesh deployment. This means that the mesh (wireless) option can be utilized in AP deployments as a failover mechanism for the wired network uplink. To be clear, communication from devices associated with an AP and communications between the APs themselves (e.g., sharing of network support information) may both be transitioned from a failed wired uplink to a mesh link. The techniques of this disclosure may include implementations where a mesh network is automatically instantiated as a portion of a network that previously had no mesh points or mesh portals as explained further below.

Having an understanding of the above overview, this disclosure now explains a non-limiting example implementation (and possible variants thereof). Each example implementation is explained with reference to the figures that include: a functional block diagram representing an example of a client connected to a slave AP (FIG. 1); a functional block diagram representing an example of a client using a slave with a master that would have been affected by a wired network failure at the access point but is redirected via a mesh network transition (FIG. 2); a functional block diagram representing a different example of a client using an AP with a controller, the client would have been affected by a wired network failure at the access point but is redirected via a mesh network transition (FIG. 3); a functional flow diagram representing an example of functions of a wireless networking device (FIG. 4); an example computing device with a hardware processor and accessible machine-readable instructions that may be used to compile and execute the algorithm that provides the functional flow of FIG. 4 (FIG. 5); a computer network infrastructure that may be used to implement all or part of the disclosed wireless network automatic reconfiguration techniques (FIG. 6); and a computer processing device that may be used to implement the functions, modules, processing platforms, execution platforms, communication devices, and other methods and processes of this disclosure (FIG. 7).

Figure 1:
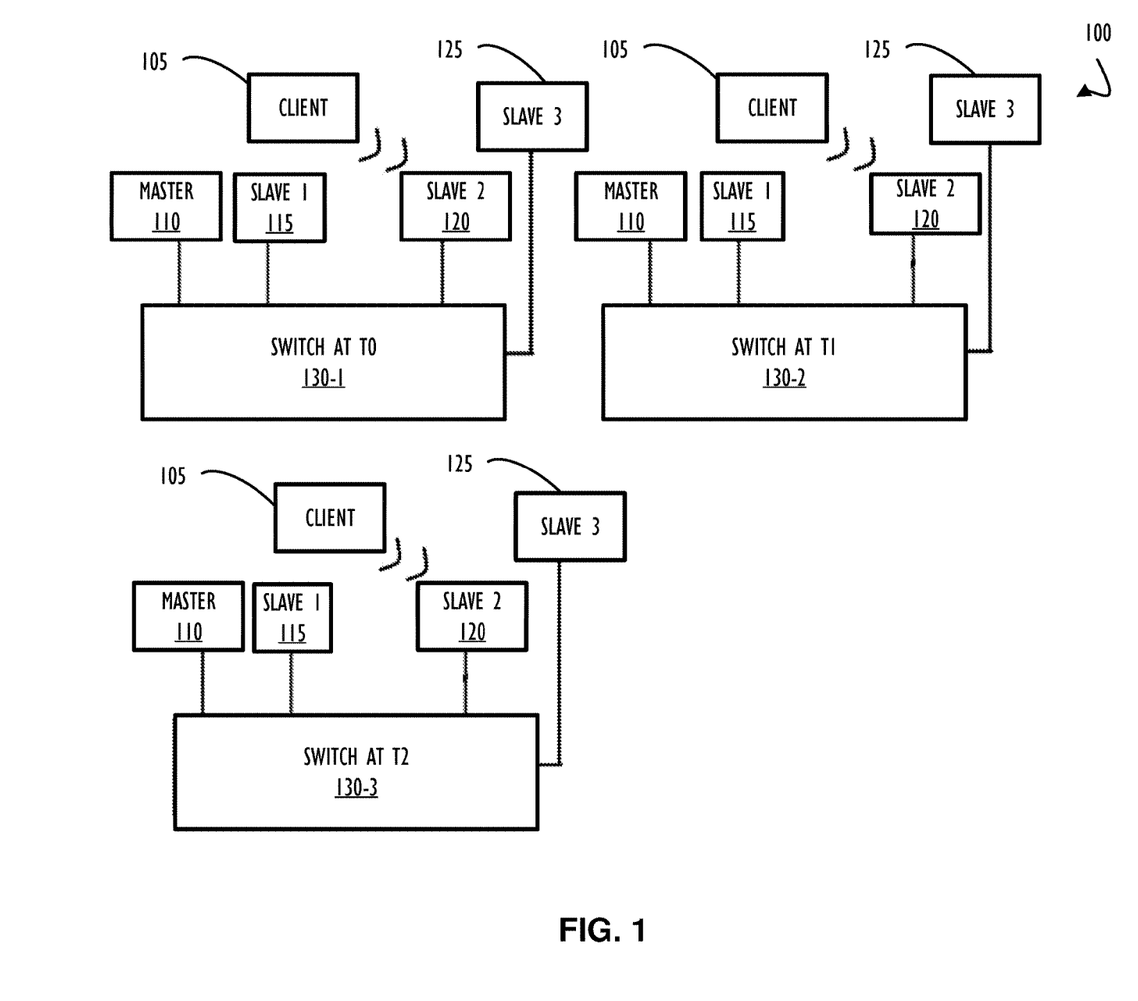
FIG. 1 is a functional block diagram representing an example of a client connected to a slave IAP, according to one or more disclosed examples.
Figure 2:
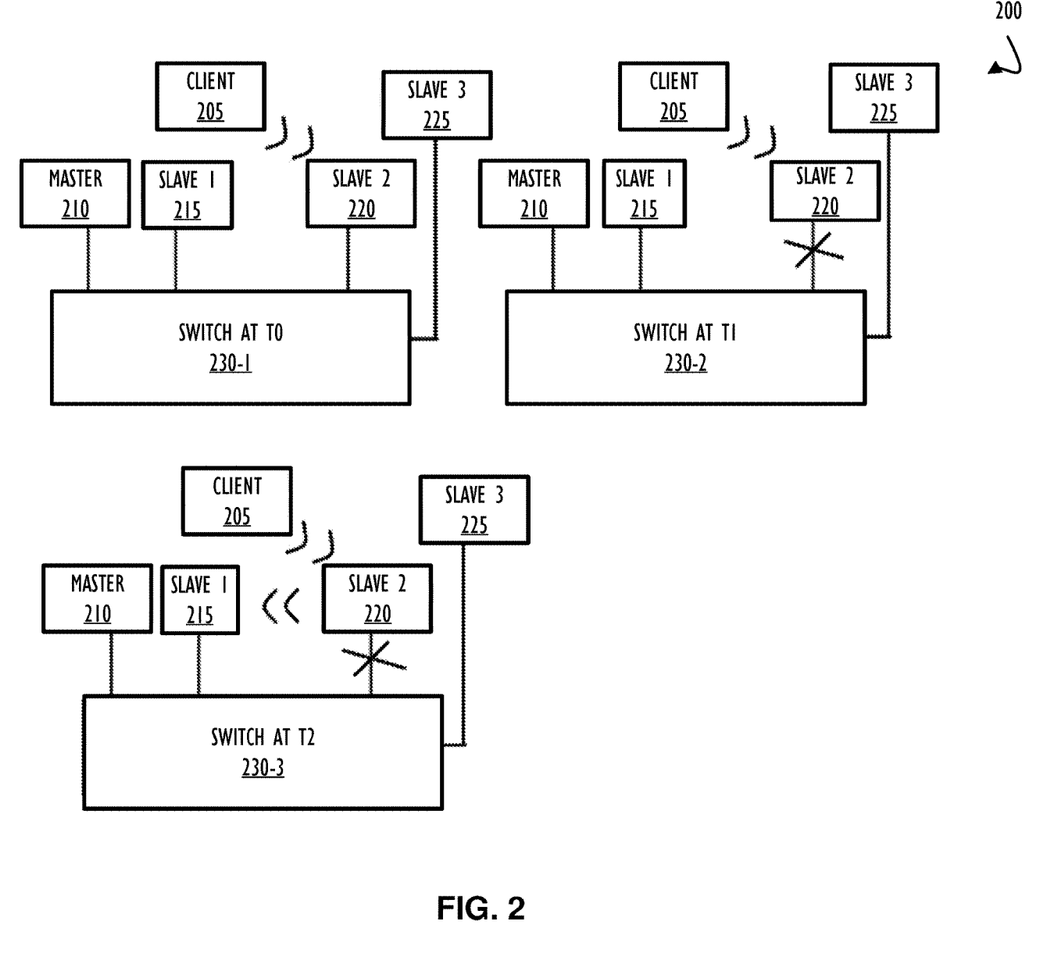
FIG. 2 is a functional block diagram representing an example of a client using a slave with a master that would have been affected by a wired network failure at the access point but is redirected via a mesh network transition, according to one or more disclosed examples.
Figure 3:
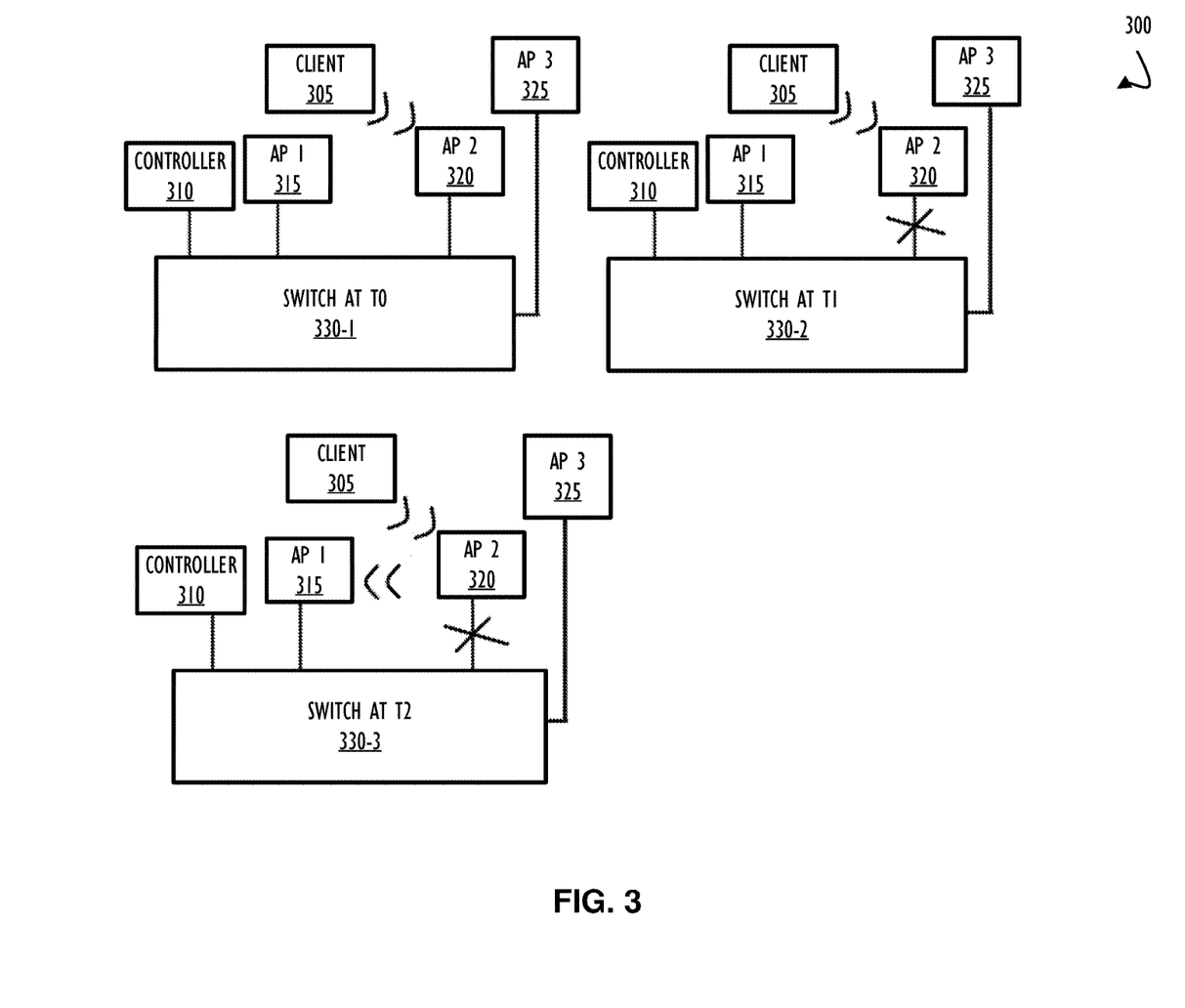
FIG. 3 is a functional block diagram representing a different example of a client, using an AP with a controller, the client would have been affected by a wired network failure at the access point but is redirected via a mesh network transition, according to one or more disclosed examples.

The decision with respect to which access point should be made into the mesh portal may be taken by the controller in some deployments and master AP in other style (e.g., master/slave) deployments (See FIGS. 1-3). A mesh portal may then be identified as an AP that is still connected to the wired network and a mesh point may be established for the AP that has lost connection to the wired network. That is, an AP that still has a wired connection may reconfigure itself (possibly at the direction of a controller or master) to become a mesh portal and the AP with a failed uplink may reconfigure itself as a mesh point using that newly established mesh portal. In some implementations, based on the failure of the wired network connection (e.g., local uplink) that AP may initiate looking for a device to utilize as a mesh portal to implement the wireless (mesh) failover. In some implementations, determining which AP is selected to provide mesh portal services may be based on a decision matrix of various parameters like signal strength and number of clients already connected to a potential mesh portal AP.

Referring now to FIGS. 1-3, one example transition (e.g., automatic network reconfiguration of APs) responsive to failure is illustrated pictorially for a master/slave configuration (FIGS. 1-2) and an AP set with a controller implementation (FIG. 3).

With reference to FIG. 1, a master/slave configuration is illustrated in network state representation 100. Because this example timeline does not include a failure, the connectivity provided to clients of slave 2 120 does not change from time T0 through time T2. In this example, client 105 connects to slave 2 120 and communicates through a single switch at each of times T0 (130-1), T1 (130-2), T2 (130-3). This configuration further illustrates an example master 110 that coordinates network activities across a set of slaves (e.g., slave 1 (115), slave 2 (120), and slave 3 (125)).

Continuing to FIG. 2, the configuration of network state representation 200 includes an initial configuration for the network path to switch at time T0 (230-1) that is identical to that of FIG. 1. However, as illustrated by switch at time T1 (230-2) a failure is indicated by the "X" on the uplink from slave 2 (220). That is, client 205 is communicating with slave 2 (220) and may experience a loss of connectivity to the wired network (e.g., because slave 2 (220) is no longer connected). In response to detection of this situation, slave 2 (220) may undergo a reconfiguration (possibly at the direction of master 210) to become a mesh point as illustrated by switch at time T2 (230-3). Also, slave 1 (215) may be automatically reconfigured to become a mesh portal to support the newly instantiated mesh point slave 2 (220). Note that no mesh points or mesh portals were present in this example prior to an uplink failure. Further, slave 3 (225) maintains a static configuration, in this example, possibly because master 210 determined that slave 1 (215) was a better candidate to support slave 2 (220) in its new role. As mentioned above, this determination may be determined by the master using a number of different parameters, such as number of clients connected via each slave or other communication and throughput considerations. Those of skill in the art, given the benefit of this disclosure, will recognize that clients of slave 2 (220) such as client 205 may be unaware that a reconfiguration has taken place automatically and therefore may not experience any adverse performance or be forced to establish a new network association with a properly functioning AP.

Referring now to FIG. 3, a similar failure scenario to that of FIG. 2 is illustrated. However, network state representation 300 illustrates client 305 communicating with AP 2 (320) where the set of three APs (e.g., AP 1 (315), AP 2 (320), and AP 3 (325)) are coordinated by controller 310 (e.g., a master controller directs individual APs with regard to their network role).

As illustrated in FIG. 3, switch at time T0 330-1 illustrates that controller 310, three APs, and client 305 for a network where client 305 communicates to a wired network using an uplink of AP 2 (320). As illustrated by the "X" between AP 2 (320) and switch at T1 (330-2), the uplink of AP 2 (320) experiences a failure. Accordingly, as illustrated with switch at T2 (330-3), AP 1 (310) may be reconfigured (e.g., at the direction of controller 310) into a mesh portal to support communications from AP 2 (320) that has reconfigured itself into a mesh point. Note that client 305 continues to communicate through AP 2 (320) after failure of the direct uplink connection of AP 2 (320) to the wired network. As mentioned above, client devices already connected to (and supported by AP 2 (320)) may continue to function and be unaware that a network reconfiguration has taken place. In scenarios where, automatic reconfiguration of AP 2 (320) does not take place, each device supported by AP 2 (320) may experience network failure until that device forms a new wireless network association (e.g., associates as defined by the 802.11 specification) with an AP that has a communication path to a wired network. Accordingly, disclosed implementations (e.g., of FIG. 3 and FIG. 2) represent an improvement to the functionality and overall stability of wireless network communications.

Figure 4:
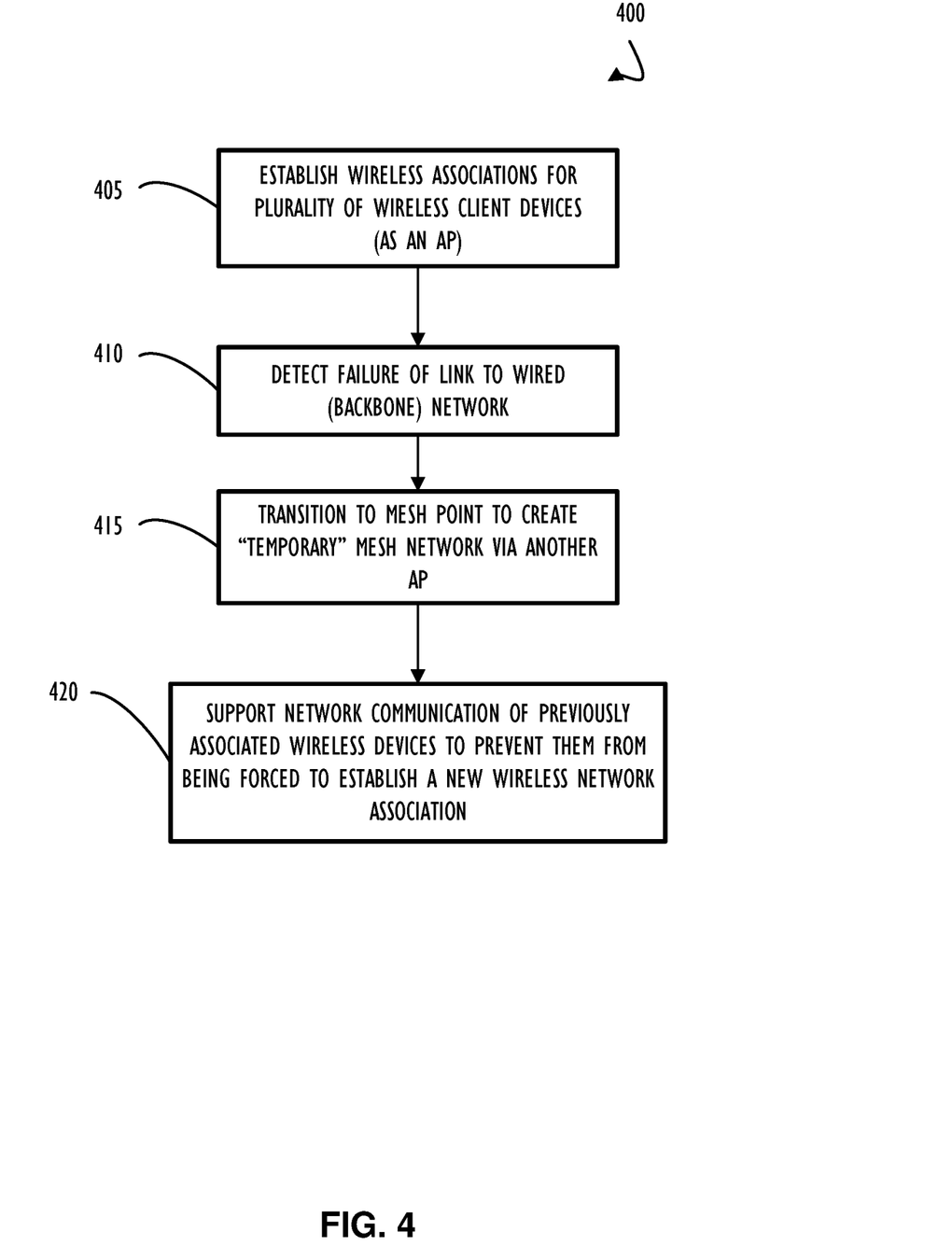
FIG. 4 is a functional flow diagram representing an example of functions of a wireless networking device, according to one or more disclosed examples.

Referring now to FIG. 4, an example flow is illustrated as method 400 representing an automatic network configuration based on an uplink failure. In this example, a master AP may be utilized with multiple slave APs. Each of the slaves communicates with the master and with each other using a wired network connection through a switch (or network of switches). Devices may connect via a wireless network connection to one of the multiple APs (e.g., slave 2 (120 or 220) or AP 2 (320) as shown in FIGS. 1-3).

Method 400 begins at block 405 where wireless associations for a plurality of client devices are established with an AP acting as an AP (as opposed to mesh node). As indicated at block 410, a failure of a link to wired backbone for a selected AP (e.g., slave 2 as shown in FIGS. 2-3) is detected and the AP with the failure is no longer able to communicate via the wired network. Accordingly, any client devices connected to the failed AP will similarly not have a path to the wired network. As illustrated at block 415, each of the master AP and affected slave (e.g., slave 2 or AP 2 in the examples above) are aware that wired connectivity has been lost. Accordingly, after a time interval (configurable as a parameter) of continued non-connectivity, the affected AP (e.g., slave 2 or AP 2) may automatically convert itself to a Mesh Point and look for a Mesh Portal.

In the scenario of this example method 400, the master AP may be aware of the BSSIDs that were broadcast by the affected AP (e.g., slave 2). Thus, responsive to the failure, the master may check with all the slave APs to determine whether any of them have maintained wireless availability (e.g., can "hear" the radio signal adequately to establish a wireless connection) with the affected AP (e.g., slave2). In one example implementation, the master AP may establish a table of slave APs that are within available communication range of slave 2 and the associated signal strengths for each of those slave APs. For example, the master AP may determine which of the available slave APs are potential Mesh Portals. Next, the master AP may make a load determination (e.g., number of clients, data throughput, etc.) for each of the potential Mesh Portal APs. After analysis, the master AP may select a slave with a functional wired connection to (at least temporarily) become the Mesh Portal in support of the AP with failure (e.g., slave 2) upon that node's reconfiguration into a mesh point. For example, if the master (or AP controller) finds that slave 1 can hear slave 2 better than slave 3 and slave 1 has lesser current data load than slave 3—slave 1 may be asked by the master AP to become the Mesh Portal. Continuing with the example, the selected slave 1 (as a mesh portal) may connect with slave 2 (the failed AP that automatically reconfigured as a Mesh Point). After connecting with each other in their new respective roles, the master AP may initiate a notification, for example to a network admin, that a failover has taken place. In one implementation, a pre-defined SSID name may be used by the mesh point and mesh portal to establish the network association after failure detection and automatic reconfiguration. As illustrated in block 420, this "temporary" mesh network that was automatically established may be used to support communications for the affected AP (e.g., slave 2) until such time as the wired connection failure may be addressed (possibly requiring manual intervention).

In an alternate implementation, multiple APs may be configured as mesh portals to share communication load from the affected AP. Further, for enhanced security while connecting the two APs, the mesh point (AP that is trying to connect with the Mesh SSID in the mesh portal AP) may be checked against an AP-whitelist database to validate that it is a valid AP rather than a rogue AP. In deployments that have a controller rather than a master AP, the controller may perform similar functions as those described above to facilitate automatic reconfiguration and node role determination.

Figure 5:
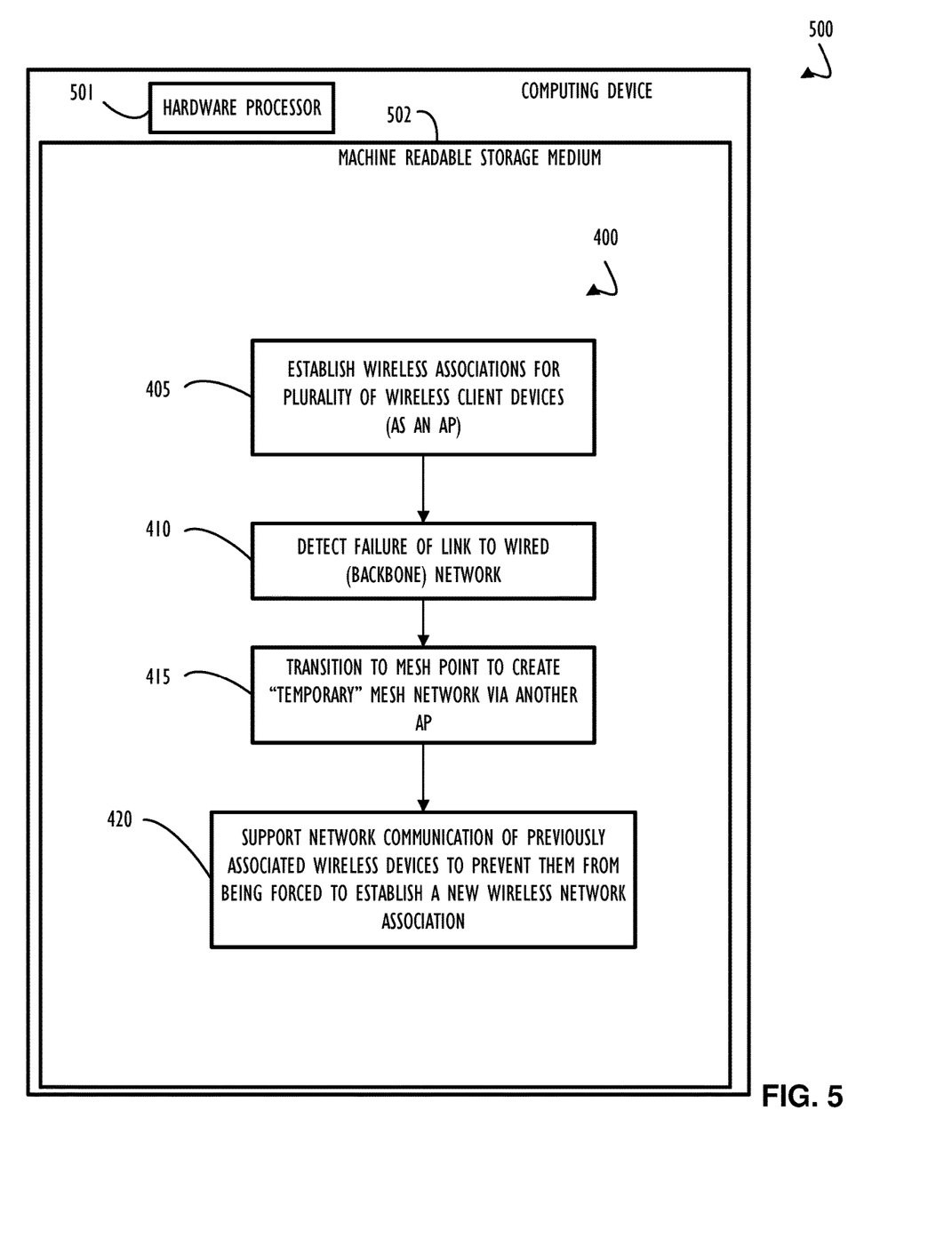
FIG. 5 is an example computing device with a hardware processor and accessible machine-readable instructions that may be used to compile and execute the algorithm that provides the functional flow of FIG. 4, according to one or more disclosed examples.

FIG. 5 is an example computing device 500, with a hardware processor 501, and accessible machine-readable instructions stored on a machine-readable medium 502 for implementing one example system incorporating mesh configuration instantiation based on wired link failure, according to one or more disclosed example implementations. FIG. 5 illustrates computing device 500 configured to perform the flow of method 400 as an example. However, computing device 500 may also be configured to perform the flow of other methods, techniques, functions, or processes described in this disclosure. In this example of FIG. 5, machine-readable storage medium 502 includes instructions to cause hardware processor 501 to perform blocks 405-420 discussed above with reference to FIG. 4.

A machine-readable storage medium, such as 502 of FIG. 5, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 6:
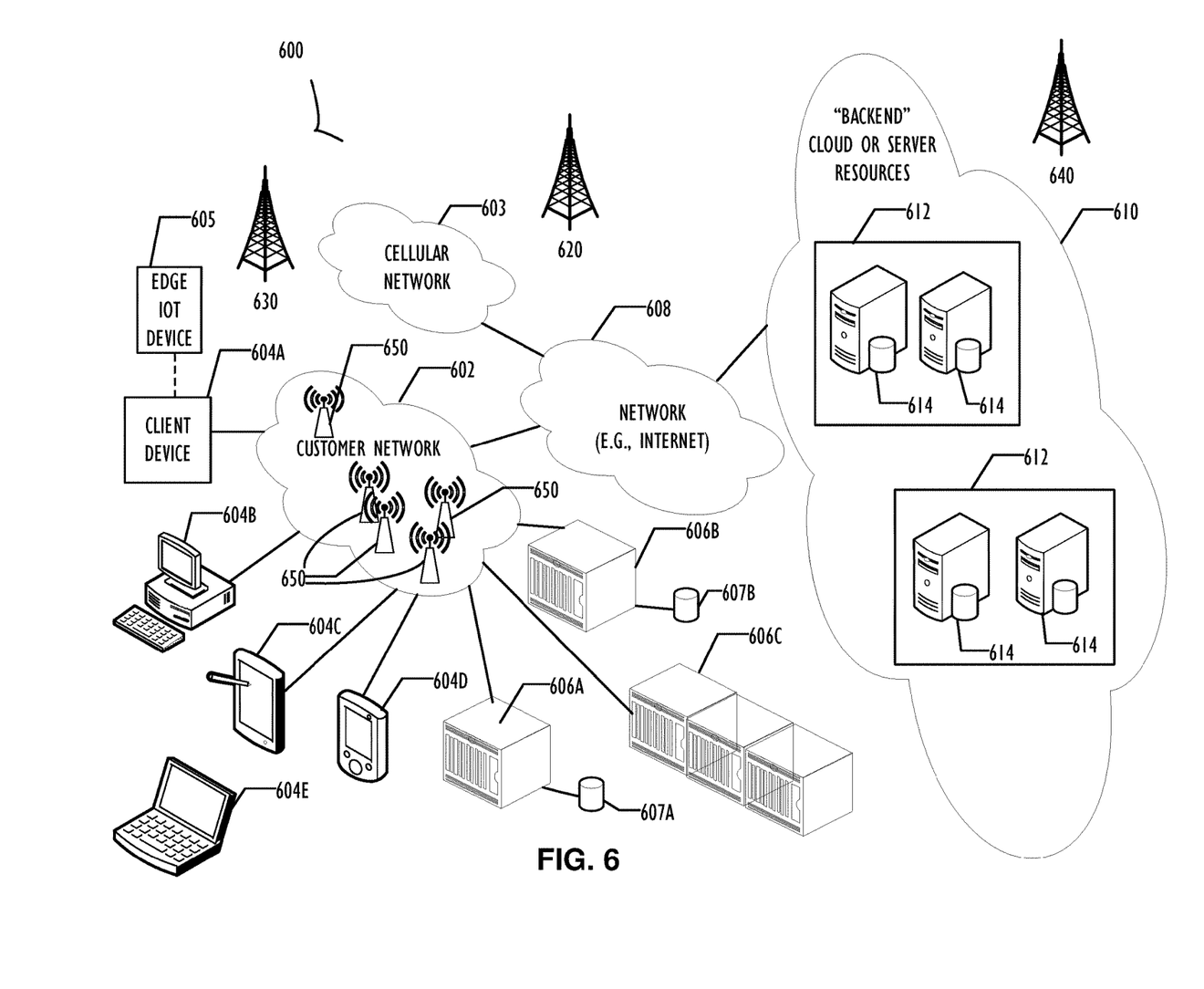
FIG. 6 represents a computer network infrastructure that may be used to implement all or part of the disclosed wireless network techniques, according to one or more disclosed implementations.
Figure 7:
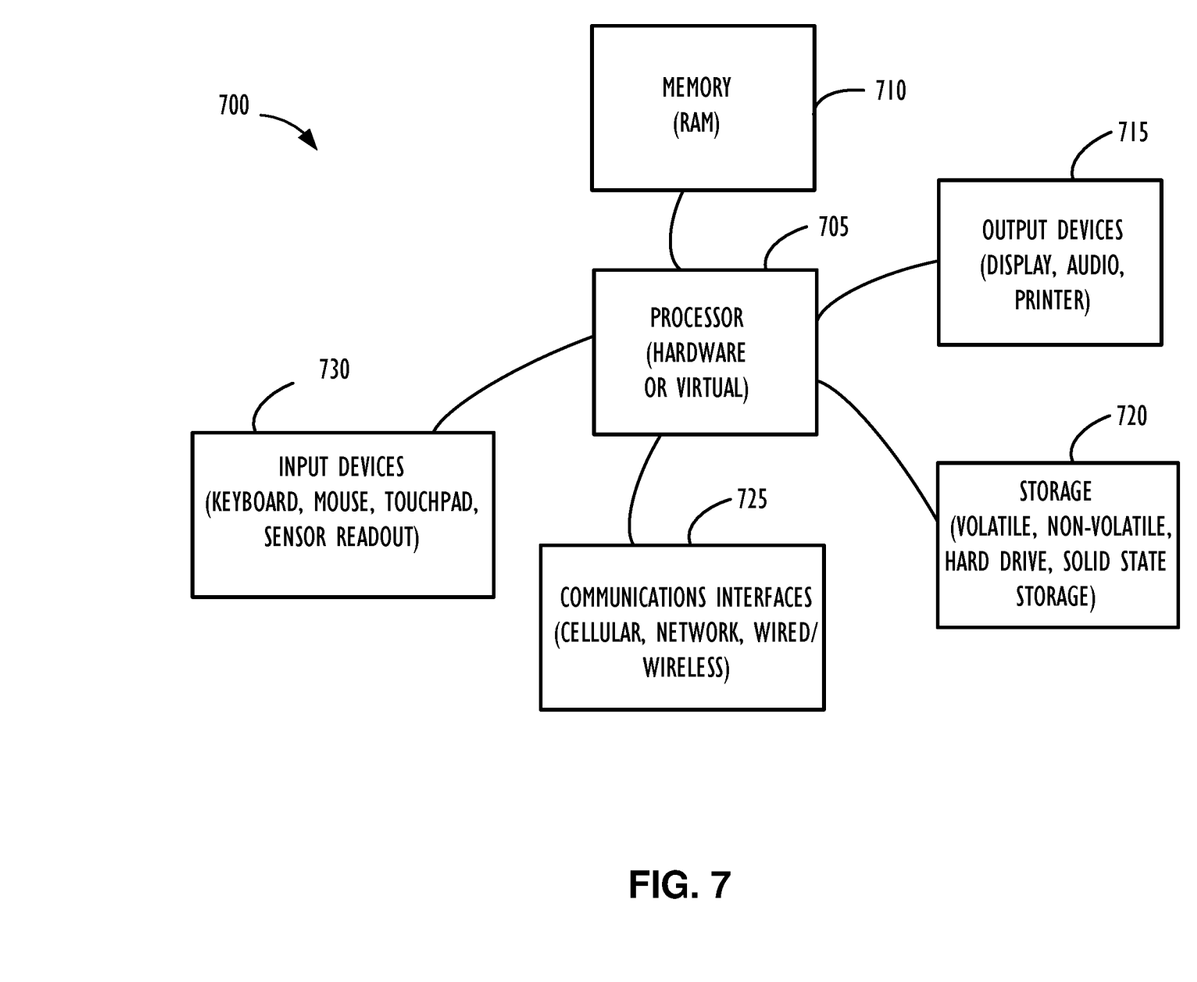
FIG. 7 illustrates a computer processing device that may be used to implement the functions, modules, processing platforms, execution platforms, communication devices, and other methods and processes of this disclosure.

Referring now to FIG. 6, a computer network infrastructure 600 is illustrated. Computer network infrastructure 600 may be used to implement all or part of the disclosed technique for an automatic network reconfiguration based on failure detection, according to one or more disclosed examples. Network infrastructure 600 includes a set of networks where implementations of the present disclosure may operate and be utilized. Network infrastructure 600 comprises a customer network 602, network 608 (e.g., the Internet), cellular network 603, and a cloud service provider network 610. In one example implementation, the customer network 602 may be a local private network, such as local area network (LAN) that includes a variety of network devices that include, but are not limited to switches, servers, and routers. Within customer network 602 there are illustrated a plurality of wireless access points 650 that may each facilitate wireless network connectivity within customer network 602. There may be one or more WLANs supported with in customer network 602 and each of these WLANs may be logically divided into one or more VLANs. Different WLANs within customer network 602 may utilize master controller or master/slave configurations to support wireless clients as described above. Some or all of the WLANs within customer network 602 may be implemented with the automatic reconfiguration capabilities to instantiate a mesh network as disclosed herein.

Each of these networks may contain wired or wireless programmable devices and operate using any number of network protocols (e.g., TCP/IP) and connection technologies (e.g., WiFi® networks, or Bluetooth®. In another example, customer network 602 represents an enterprise network that could include or be communicatively coupled to one or more local area networks (LANs), virtual networks, data centers (see FIG. 2) and/or other remote networks (e.g., 608, 610). In the context of the present disclosure, customer network 602 may include a network device supporting a change management system such as that described above. Additionally, customer network 602 may represent a target network supported by disclosed implementations of automatic reconfiguration on failure of a wired uplink.

As shown in FIG. 6, customer network 602 may be connected to one or more client devices 604A-E and allow the client devices 604A-E to communicate with each other and/or with cloud service provider network 610, via network 608 (e.g., Internet). Client devices 604A-E may be computing systems such as desktop computer 604B, tablet computer 604C, mobile phone 604D, laptop computer (shown as wireless) 604E, and/or other types of computing systems generically shown as client device 604A.

Network infrastructure 600 may also include other types of devices generally referred to as Internet of Things (IoT) (e.g., edge IoT device 605) that may be configured to send and receive information via a network to access cloud computing services or interact with a remote web browser application (e.g., to receive configuration information).

FIG. 6 also illustrates that customer network 602 includes local compute resources 606A-C that may include a server, access point, router, or other device configured to provide for local computational resources and/or facilitate communication amongst networks and devices. For example, local compute resources 606A-C may be one or more physical local hardware devices. Local compute resources 606A-C may also facilitate communication between other external applications, data sources (e.g., 606A and 606B), and services, and customer network 602.

Network infrastructure 600 also includes cellular network 603 for use with mobile communication devices. Mobile cellular networks support mobile phones and many other types of mobile devices such as laptops etc. Mobile devices in network infrastructure 600 are illustrated as mobile phone 604D, laptop computer 604E, and tablet computer 604C. A mobile device such as mobile phone 604D may interact with one or more mobile provider networks as the mobile device moves, typically interacting with a plurality of mobile network towers 620, 630, and 640 for connecting to the cellular network 603.

FIG. 6 illustrates that customer network 602 is coupled to a network 608. Network 608 may include one or more computing networks available today, such as other LANs, wide area networks (WAN), the Internet, and/or other remote networks, in order to transfer data between client devices 604A-D and cloud service provider network 610. Each of the computing networks within network 608 may contain wired and/or wireless programmable devices that operate in the electrical and/or optical domain.

In FIG. 6, cloud service provider network 610 is illustrated as a remote network (e.g., a cloud network) that is able to communicate with client devices 604A-E via customer network 602 and network 608. The cloud service provider network 610 may act as a platform that provides additional computing resources to the client devices 604A-E and/or customer network 602. In one example implementation, cloud service provider network 610 includes one or more data centers 612 with one or more server instances 614. Cloud service provider network 610 may also include one or more frames representing a scalable compute resource that may benefit from the techniques of this disclosure. Each of the disclosed network reconfiguration capabilities may be implemented for one or more data centers (not specifically illustrated) that may benefit from disclosed techniques for additional fault tolerance.

FIG. 7 illustrates a computing device 700 that may be used to implement the functions, modules, processing platforms, execution platforms, communication devices, and other methods and processes of this disclosure. For example, although not specifically mentioned above, different functionality for an automatic network configuration based on wired uplink failure may be implemented by different functional modules that may execute directly on physical hardware or be implemented with at least one level of abstraction from the physical processors and utilize virtualization. For example, computing device 700 illustrated in FIG. 7 could represent a client device or a physical server device and include either hardware or virtual processor(s) depending on the level of abstraction of the computing device. In some instances (without abstraction), computing device 700 and its elements, as shown in FIG. 7, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware.

As also shown in FIG. 7, computing device 700 may include one or more input devices 730, such as a keyboard, mouse, touchpad, or sensor readout (e.g., biometric scanner) and one or more output devices 715, such as displays, speakers for audio, or printers. Some devices may be configured as input/output devices also (e.g., a network interface or touchscreen display).

Computing device 700 may also include communications interfaces 725, such as a network communication unit that could include a wired communication component and/or a wireless communications component, which may be communicatively coupled to processor 705. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 7, computing device 700 includes a processing element such as processor 705 that contains one or more hardware processors, where each hardware processor may have a single or multiple processor core. In one implementation, the processor 705 may include at least one shared cache that stores data (e.g., computing instructions) that are utilized by one or more other components of processor 705. For example, the shared cache may be a locally cached data stored in a memory for faster access by components of the processing elements that make up processor 705. In one or more implementations, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 7, the processing elements that make up processor 705 may also include one or more of other types of hardware processing components, such as graphics processing units (GPU), application specific integrated circuits (ASICs), field-programmable gate arrays (FPGAs), and/or digital signal processors (DSPs).

FIG. 7 illustrates that memory 710 may be operatively and communicatively coupled to processor 705. Memory 710 may be a non-transitory medium configured to store various types of data. For example, memory 710 may include one or more storage devices 720 that comprise a non-volatile storage device and/or volatile memory. Volatile memory, such as random-access memory (RAM), can be any suitable non-permanent storage device. The non-volatile storage devices 720 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 720 may be used to store overflow data if allocated RAM is not large enough to hold all working data. The non-volatile storage devices 720 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 705. In one implementation, the compiling process of the software program may transform program code written in a programming language to another computer language such that the processor 705 is able to execute the programming code. For example, the compiling process of the software program may generate an executable program that provides encoded instructions (e.g., machine code instructions) for processor 705 to accomplish specific, non-generic, particular computing functions.

After the compiling process, the encoded instructions may then be loaded as computer executable instructions or process steps to processor 705 from storage device 720, from memory 710, and/or embedded within processor 705 (e.g., via a cache or on-board ROM). Processor 705 may be configured to execute the stored instructions or process steps in order to perform instructions or process steps to transform the computing device into a non-generic, particular, specially programmed machine or apparatus. Stored data, e.g., data stored by a storage device 720, may be accessed by processor 705 during the execution of computer executable instructions or process steps to instruct one or more components within the computing device 700.

A user interface (e.g., output devices 715 and input devices 730) can include a display, positional input device (such as a mouse, touchpad, touchscreen, or the like), keyboard, or other forms of user input and output devices. The user interface components may be communicatively coupled to processor 705. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 700 may comprise other components well known in the art, such as sensors, powers sources, and/or analog-to-digital converters, not explicitly shown in FIG. 7.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A wireless networking device comprising:
 a first radio coupled to a wireless communication interface to communicate with a plurality of wireless remote client devices;
 a wired network interface communicatively coupled to a wired network;
 a processing device communicatively coupled to the first radio, the wireless communication interface, and the wired network interface; and
 a memory storing instructions, that when executed by the processing device, cause the wireless networking device to:
  establish a plurality of network associations with the plurality of wireless remote client devices via the first radio to enable access to the wired network, via the wired network interface, for the plurality of wireless remote client devices;
  receive an indication of failure of the wired network interface;
  determine a set of potential mesh portals from a plurality of remote wireless access points, the set of potential mesh portals comprising remote wireless access points suitable to serve as a mesh portal for the wireless network device based on a detected signal strength of and a number of clients connected to each respective remote wireless access point;
  establish a wireless communication path from the wireless networking device to the set of potential mesh portals; and
  act as a mesh point within a mesh network, the mesh point using the established wireless communication paths as a mesh link to each of the remote wireless access points within the set of potential mesh portals, to continue to support network communication for the plurality of wireless remote clients,
 wherein each of the plurality of remote wireless access points of the set of potential mesh portals are configured to share a communication load from the wireless network device having an indication of a failure of the wired network interface, and
 wherein neither the wireless network device nor the plurality of remote wireless access points are configured as a mesh point or a mesh portal prior to receiving the indication of failure of the wired network interface.

2. The wireless networking device of claim 1, further comprising:
 a second radio communicatively coupled to the wireless communication interface, wherein control commands between a controller and the wireless networking interface are transmitted via the second radio and data communications are transmitted via the first radio.

3. The wireless networking device of claim 1, further comprising:
 instructions, that when executed by the processing device, cause the wireless networking device to transmit and receive control commands between a controller and the wireless networking device via the wired network interface.

4. The wireless networking device of claim 1, further comprising:
instructions, that when executed by the processing device, cause the wireless networking device to automatically initiate reconfiguration responsive to detection of failure of the wired network interface.

5. The wireless networking device of claim 1, wherein the instructions to cause the wireless networking device to establish a wireless communication path from the wireless networking device to the set of potential mesh portals comprise instructions to search for a plurality of previously defined SSIDs.

6. A computer-implemented method for automatically reconfiguring a a plurality of wireless access points responsive to failure of a wired uplink on a first wireless access point, the method comprising:
establishing a plurality of network associations with a plurality of wireless client devices communicatively coupled to a wired network via the first wireless access point;
receiving an indication of failure of the wired uplink on the first wireless access point;
establishing a wireless communication path from the first wireless access point to a set of potential mesh portals from a plurality of remote wireless access points as part of instantiating a mesh network responsive to the indication of failure;
utilizing the first wireless access point as a mesh point in the instantiated mesh network;
utilizing each of the wireless communication paths as a mesh link in the instantiated mesh network communicatively coupling the first wireless access point to each of the remote wireless access points in the set of potential mesh portals; and
utilizing each of the remote wireless access points within the set of potential mesh portals as a mesh portal in the instantiated mesh network to share a communication load from the wireless network device having an indication of a failure of the wired network interface, and
wherein neither the wireless network device nor the plurality of remote wireless access points are configured as a mesh point or a mesh portal prior to receiving the indication of failure of the wired network interface.

7. The computer-implemented method of claim 6, wherein network communication for a plurality of wireless client devices continues to be provided by the first wireless access point after the indication of failure.

8. The computer-implemented method of claim 6, wherein an indication of failure of the wired uplink on the first wireless access point is determined by a controller of the plurality of wireless access points and the controller selects the set of potential mesh portals to act as mesh portals based on attributes of the remote wireless access points in the set of potential mesh portals relative to other wireless access points in the plurality of remote wireless access points.

9. The computer-implemented method of claim 8, wherein the attributes include number of currently supported client devices.

10. The computer-implemented method of claim 8, wherein the attributes include network utilization.

11. The computer-implemented method of claim 8, wherein the attributes include radio signal strength, as received by each potential mesh portal AP, available from the first wireless access point.

12. The computer-implemented method of claim 6, wherein establishing a wireless communication path from the first wireless access point to the second wireless access point includes the first wireless access point searching for a previously defined SSID.

13. The computer-implemented method of claim 6, wherein establishing a wireless communication path from the first wireless access point to the two or more of the plurality of wireless access points includes each of the two or more of the plurality of wireless access points validating the first wireless access point against a white list.

14. The computer-implemented method of claim 13, wherein establishing a wireless communication path from the first wireless access point to the two or more of the plurality of wireless access points is prevented based on failure of validating the first wireless access point against the white list.

15. The computer-implemented method of claim 6, further comprising:
receiving an indication of restoration of the wired uplink on the first wireless access point;
decommissioning the mesh network from the first wireless access point; and
restoring data communication from the first wireless access point to utilize the wired uplink.

16. The computer-implemented method of claim 15, wherein the indication of restoration of the wired uplink is determined by a controller of the plurality of wireless access points.

17. The computer-implemented method of claim 16, wherein the controller provides an indication to the set of potential mesh portals second wireless access point to decommission the mesh network.

18. A non-transitory computer readable medium comprising computer executable instructions that, when executed by one or more processing units, cause the one or more processing units to:
establish a plurality of network associations with a plurality of wireless client devices communicatively coupled to a wired network via the first wireless access point;
receive an indication of failure of the wired uplink on the first wireless access point;
establish a wireless communication path from the first wireless access point to a set of potential mesh portals from a plurality of remote wireless access points as part of instantiating a mesh network responsive to the indication of failure;
utilize the first wireless access point as a mesh point in the instantiated mesh network;
utilize each of the wireless communication paths as mesh links in the instantiated mesh network communicatively coupling the first wireless access point to each of the remote wireless access points in the set of potential mesh portals; and
utilize each of the remote wireless access points within the set of potential mesh portals as a mesh portal in the instantiated mesh network to share a communication load from the wireless network device having an indication of a failure of the wired network interface, and
wherein neither the wireless network device nor the plurality of remote wireless access points are configured as a mesh point or a mesh portal prior to receiving the indication of failure of the wired network interface.

19. The non-transitory computer readable medium of claim 18, further comprising computer executable instructions that, when executed by one or more processing units, cause the one or more processing units to:
- receive an indication of restoration of the wired uplink on the first wireless access point; and
- decommission the mesh network from the first wireless access point; and
- restore data communication from the first wireless access point to utilize the wired uplink.

20. The non-transitory computer readable medium of claim 19, wherein a controller provides an indication to the two or more of the plurality of wireless access points to decommission the mesh network.

\* \* \* \* \*